United States Patent
Bonnet et al.

(10) Patent No.: US 6,811,859 B2
(45) Date of Patent: Nov. 2, 2004

(54) COMPOSITION COEXTRUDABLE WITH PVDF

(75) Inventors: Anthony Bonnet, Beaumont le Roger (FR); Francois Beaume, Bernay (FR); Karine Loyen, Pont-Audemer (FR); Karine Triballier, Saint Elois de Fourques (FR); David Silagy, Evreux (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/619,558

(22) Filed: Jul. 16, 2003

(65) Prior Publication Data

US 2004/0086721 A1 May 6, 2004

(30) Foreign Application Priority Data

Jul. 17, 2002 (FR) .............................. 02 09024
Sep. 27, 2002 (FR) .............................. 02 11991

(51) Int. Cl.$^7$ .................... B32B 27/08; B32B 27/18; B32B 27/30; C08L 27/16; C08L 33/12
(52) U.S. Cl. ................. 428/216; 428/327; 428/421; 428/520; 428/521; 428/522; 525/94; 525/199; 525/222
(58) Field of Search .................. 525/94, 199, 222; 428/216, 327, 421, 520, 521, 522

(56) References Cited

U.S. PATENT DOCUMENTS

| 3,524,906 | A | | 8/1970 | Hartley, Jr. et al. |
| 4,868,036 | A | | 9/1989 | Robinet |
| 5,242,976 | A | * | 9/1993 | Strassel et al. ............... 525/72 |
| 5,256,472 | A | * | 10/1993 | Moriya et al. ............. 428/215 |

FOREIGN PATENT DOCUMENTS

EP            0306385            3/1989

* cited by examiner

*Primary Examiner*—Ramsey Zacharia
(74) *Attorney, Agent, or Firm*—Millen, White, Zelano & Branigan, P.C.

(57) ABSTRACT

A composition coextrudable with PVDF comprises in parts by weight: 20 to 40 parts of PVDF; 40 to 60 parts of PMMA; 5 to 18 parts of an acrylic elastomer; 1 to 4 parts of a UV absorber; the total making 100 parts. Coextruded films comprise a layer of the above coextrudable composition directly attached to the latter; and a PVDF-based layer comprising, as main constituents, 50 to 100 parts of PVDF per 50 to 0 parts of PMMA respectively. The PVDF layer may be in the form of two layers: one placed against the coextrudable layer and comprising, as main constituents, 50 to 90 parts of PVDF per 50 to 10 parts of PMMA respectively; and the other (also called the outer layer) comprising, as main constituents, 75 to 100 parts of PVDF per 25 to 0 parts of PMMA respectively. The resultant products are generally applied to substrates, e.g. as protective films.

20 Claims, No Drawings

COMPOSITION COEXTRUDABLE WITH PVDF

PVDF (polyvinylidene fluoride) because of its very good weatherablity, radiation resistance and chemical resistance is used to protect articles or materials. In addition, it is appreciated for its glossy appearance and its resistance to graffiti. This has therefore led all kinds of substrates to be coated with a PVDF film. However, PVDF adheres very poorly to most substrates and it is therefore necessary to place an adhesive composition between the PVDF and the substrate. The present invention relates to this composition.

Advantageously, this composition is coextruded with the PVDF in order to form a two-layer film, and then this film is attached to the substrate, for example by hot pressing. The two-layer film may also be placed in a mould, the PVDF layer being placed against the wall of the mould, and then the substrate may be injected in the melt state into the mould. It is also possible, depending on the nature of the substrate, to coextrude the PVDF, the adhesive composition and the substrate in order to obtain the PVDF-coated substrate directly, with the adhesive composition being between the PVDF and the substrate.

Patent GB 1 578 517 describes an ABS coated with a PVDF film, a polyurethane layer possibly being placed between the PVDF and the ABS.

Patent U.S. Pat. No. 4,226,904 describes a PMMA covered with a PVDF film. To improve the adhesion, a PMMA solution in dimethylformamide is deposited on the PVDF film and, after the solvent has evaporated, the PVDF film is pressed onto the PMMA.

Patent U.S. Pat. No. 4,415,519 describes an ABS or PVC substrate covered with a PVDF film, an adhesive being placed between the PVDF and the substrate. This adhesive may be either PMMA or a blend of 40% PMMA, 30% PVDF, and 30% ABS by weight, or else a blend consisting of 30% PMMA, 40% of a polyacrylic derivative and 30% ABS by weight.

Patent U.S. Pat. No. 4,364,886 describes an ABS or unsaturated polyester substrate covered with a PVDF film, an adhesive being placed between the PVDF and the substrate. This adhesive is a blend of 30% PMMA, 40% of an acrylic elastomer and 30% ABS by weight.

Patent U.S. Pat. No. 5,242,976 describes a composition coextrudable with PVDF in order to make it adhere to substrates. The composition is a blend of 27 to 50% PMMA, 17.5 to 36.5% PVDF and 25 to 47.45% of an acrylic elastomer by weight.

In all the above documents of the prior art, there is no mentioned of UV stabilisers in the adhesive composition.

Patent EP 733 475 B1 describes PVDF-coated substrates; the structure comprises, in succession, the substrate, an adhesive layer, a PVDF layer made opaque to UV and to visible radiation and a PVDF layer. The opaque PVDF layer is obtained by adding a product chosen from metal oxides, pigments and benzophenones to the PVDF. The examples illustrate only PVDF filled with 15% by weight of zinc oxide.

Patent U.S. Pat. No. 5,256,472 describes two-layer films comprising a first layer essentially consisting of PVDF and of a minor amount of PMMA and a second layer intended to ensure adhesion to a substrate. This adhesive layer consists by weight of 50 to 95 (preferably 70 to 90) parts of PMMA, 5 to 50 (preferably 10 to 30) parts of PVDF and 0.1 to 15 parts of a UV absorber. It is explained that the presence of the UV absorber is necessary because this adhesive layer is sensitive to radiation and that if no UV absorber is included then the adhesive is destroyed and the layer essentially consisting of PVDF debonds from the substrate. The term "PMMA" denotes methyl methacrylate homopolymers or methyl methacrylate copolymers with a copolymerisable monomer and also blends with an acrylate rubber, but without specifying the proportions of PMMA and of rubber. It is also specified that if the proportion of PMMA is less than 50 parts, the dispersion of the UV absorber tends to be inadequate and evaporation or dissipation of the UV absorber is likely to take place, such being undesireble (column 4, lines 25–29). In addition, it has been discovered that this exudation of absorber impairs the transparency of the films and above all causes debonding. In addition, these films have no mechanical strength, making them difficult to handle. It is therefore necessary for the adhesive layer to contain an elastomer; and, according to the teaching of U.S. Pat. No. 5,242,976 already mentioned, this proportion must be between 25 and 47.45% as calculated from the minimum and maximum values set forth in the abstract and column 2, lines 6–14.

A composition coextrudable with PVDF has now been found such that the UV stabilisers no longer exude, such that the PVDF/coextrudable composition two-layer film has good mechanical strength, which results in excellent adhesion of the PVDF layer to the substrate and which is resistant to radiation.

The present invention relates to a composition suitable as an adhesive layer coextrudable with PVDF and comprising:
  20 to 40 parts of PVDF;
  40 to 60 parts of PMMA;
  5 to 18 parts of an acrylic elastomer;
  1 to 4 parts of a UV absorber;
  the total making 100 parts.

Thus, the composition of the invention on the one hand can tolerate less than 50 parts by weight of PMMA and on the other hand the relationship among the components is very different than the relationships in U.S. Pat. No. 5,242,976.

The invention also relates to coextruded films comprising:
  a layer of the above coextrudable composition (also called adhesive layer) directly attached to the latter; and
  a PVDF-based layer comprising, as main constituents, 50 to 100 parts of PVDF per 50 to 0 parts of PMMA respectively (this layer is also called for simplification "PVDF layer").

According to a second form of the invention, the PVDF layer is in the form of two layers:
  one placed against the coextrudable layer and comprising, as main constituents, 50 to 90 parts of PVDF per 50 to 10 parts of PMMA respectively; and
  the other (also called the outer layer) comprising, as main constituents, 75 to 100 parts of PVDF per 25 to 0 parts of PMMA respectively.

These films possess mechanical properties sufficient to allow them to be handled to be processed and to be used as a coating transparent to visible light but opaque to UV radiation.

The invention also relates to the substrates coated with this film, the coextrudable (adhesive) composition being placed against the substrate.

With regard to PVDF, this term denotes PVDFs, vinylidene fluoride (VF2) homopolymers and vinylidene fluoride (VF2) copolymers preferably containing at least 50% by weight of VF2 and at least one other monomer copolymerisable with VF2. Advantageously, the comonomer is fluorinated and may be chosen, for example, from the vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl)vinyl ethers, such as perfluoro(methyl)vinyl ether (PMVE), perfluoro(ethyl) vinyl ether (PEVE) and perfluoro(propyl) vinyl ether (PPVE); perfluoro(1,3-dioxole); perfluoro(2,2-dimethyl-1,3-dioxole) (PDD). Preferably, the possible comonomer is chosen from chlorotrifluoroethylene (CTFE), hexafluoroproylene (HFP), trifluoroethylene (VF3) and tetrafluoroethylene (TFE).

Advantageously, the PVDF has a viscosity ranging from 100 Pa.s to 2000 Pa.s, the viscosity being measured at 230° C. at a shear rate of 100 s$^{-1}$ using a capillary rheometer. This is because these PVDFs are well suited to extrusion and to injection moulding. Preferably, the PVDF has a viscosity ranging from 300 Pa.s to 1200 Pa.s, the viscosity being measured at 230° C. at a shear rate of 100 s$^{-1}$ using a capillary rheometer.

With regard to PMMA, this term denotes methyl methacrylate homopolymers and copolymers containing at least 50% methyl methacrylate by weight. As examples of comonomers, mention may be made, for example, of alkyl (meth)acrylates, acrylonitrile, butadiene, styrene and isoprene. Examples of alkyl(meth)acrylates are described in Kirk-Othmer Encyclopaedia of Chemical Technology, 4$^{th}$ Edition in Vol. 1, pages 292–293 and in Vol. 16, pages 475–478. Advantageously, the PMMA may contain 0 to 20% and preferably 5 to 15% of methyl acrylate and/or ethyl acrylate by weight. The PMMA may be functionalised, that is to say it contains, for example, acid, acid chloride, alcohol or anhydride functional groups. These functional groups may be introduced by grafting or by copolymerisation. Advantageously, this is an acid functional group provided by the acrylic acid comonomer. Two neighbouring acrylic acid functional groups may lose water to form an anhydride. The proportion of functional groups may be between 0 and 15% by weight of the PMMA containing the optional functional groups.

The MVI (melt volume index) of the PMMA may be between 2 and 15 cm$^3$/10 min measured at 230° C. under a load of 3.8 kg.

With regard to the acrylic elastomer, this denotes any one of the following: Elastomers produced from monomers comprising acrylonitrile, for example, a copolymer of acrylonitrile and at least one monomer chosen from butadiene, isoprene, alkyl (meth)acrylate and styrene. Elastomers produced from monomers comprising alkyl(meth)acrylates, for example, copolymers of alkyl(meth)acrylate and at least one monomer chosen from butadiene, isoprene, acrylonitrile and styrene, and core-shell materials.

As regards a core-shell material, this is in the form of fine particles having an elastomer core and at least one thermoplastic shell, the size of the particles being in general less than 1 µm and advantageously between 50 and 300 nm. The core-shell materials, because they contain at least 2 chemically different monomeric are referred to hereinafter as copolymers.

As an example of core materials, examples are isoprene or butadiene homopolymers, isoprene copolymers with at most 30 mol % of a vinyl monomer and butadiene copolymers with at most 30 mol % of a vinyl monomer. The vinyl monomer may be styrene, an alkyl styrene, acrylonitrile or an alkyl(meth)acrylate. Another core family consists of homopolymers of an alkyl(meth)acrylate and copolymers of an alkyl(meth)acrylate with at most 30 mol % of a monomer chosen from another alkyl(meth)acrylate, and a vinyl monomer. Advantageously, the alkyl(meth)acrylate is butyl acrylate. The vinyl monomer may be styrene, an alkyl styrene, acrylonitrile, butadiene or isoprene. The core of the core-shell copolymer may be completely or partly crosslinked. All that is required is to add at least difunctional monomers during preparation of the core, it being possible for these monomers to be chosen from poly(meth)acrylic esters of polyols such as butylene di(meth)acrylate and trimethylolpropane trimethacrylate. Other difunctional monomers are, for example, divinylbenzene, trivinylbenzene, vinyl acrylate and vinyl methacrylate. The core may also be crosslinked by introducing into it, by grafting or as comonomer during polymerisation, unsaturated functional monomers such as unsaturated carboxylic acid anhydrides, unsaturated carboxylic acids and unsaturated epoxides. For example, mention may be made of maleic anhydride, (meth)acrylic acid and glycidyl methacrylate.

The shell or shells are styrene, alkyl styrene or methyl methacrylate homopolymers or copolymers containing at least 70 mol % of one of these monomers mentioned above and at least one comonomer chosen from the other monomers mentioned above, another alkyl(meth)acrylate, vinyl acetate and acrylonitrile. The shell may be functionalised by introducing thereinto, by grafting or as comonomer during polymerisation, unsaturated functional monomers such as unsaturated carboxylic acid anhydrides, unsaturated carboxylic acids and unsaturated epoxides. As examples, mention may be made of maleic anhydride, (meth)acrylic acid and glycidyl methacrylate. Mention may be made, for example, of core-shell copolymers having a polystyrene core and core-shell copolymers having a PMMA shell. There are also core-shell copolymers having two shells, one made of polystyrene and the other on the outside made of PMMA. Examples of copolymers and their method of preparation are described in the following patents: U.S. Pat. Nos. 4,180,494, 3,808,180, 4,096,202, 4,260,693, 3,287,443, 3,657,391, 4,299,928, 3,985,704 and 5,773,520.

Advantageously, the core represents 70 to 90% and the shell 30 to 10% by weight of the core-shell copolymer.

As an example of a copolymer, mention may be made of that comprises (i) of 75 to 80 parts of a core comprising at least 93 mol % of butadiene, 5 mol % of styrene and 0.5 to 1 mol % of divinylbenzene and (ii) 25 to 20 parts of two shells essentially of the same weight, the inner one made of polystyrene and the other outer one made of PMMA.

As another example, mention may be made of those having a poly(butyl acrylate) or butyl acrylate/butadiene copolymer core and a PMMA shell. All these core-shell copolymers are sometimes called soft/hard copolymers because of the elastomer core.

There are also other types of core-shell copolymers such as hard/soft/hard copolymers, that is to say they have, in this order, a hard core, a soft shell and a hard shell. The hard parts may comprise the polymers of the shell of the above soft/hard copolymers and the soft part may comprise the polymers of the core of the above soft/hard copolymers. Non-limiting examples of such core-shell polymers comprise in order:

a core made of a methyl methacrylate/ethyl acrylate copolymer;

a shell made of a butyl acrylate/styrene copolymer; and a core made of a methyl methacrylate/ethyl acrylate copolymer.

There are also other types of core-shell copolymers such as hard (core)/soft/semi-hard copolymers. Compared with the previous ones, the difference stems from the "semi-hard" outer shell which comprises two shells, one being the intermediate shell and the other the outer shell. The intermediate shell is a copolymer of methyl methacrylate, styrene and at least one monomer chosen from alkyl acrylates, butadiene and isoprene. The outer shell is a PMMA homopolymer or copolymer. Non-limiting examples of such copolymers comprise in order:

- a core made of a methyl methacrylate/ethyl acrylate copolymer;
- a shell made of a butyl acrylate/styrene copolymer;
- a shell made of a methyl methacrylate/butyl acrylate/styrene copolymer; and
- a shell made of a methyl methacrylate/ethyl acrylate copolymer.

When choosing the proportions of acrylic elastomer, it is necessary to take into account that which may already be contained in the PMMA. This is because there are commercial grades of PMMA called "impact" grades which contain acrylic impact modifiers, usually of the core-shell type. These acrylic impact modifiers may also be present in the PMMA because they were introduced during its polymerisation or prepared simultaneously during its polymerisation.

As regards the UV absorber, these are products known per se. Such products are cited in U.S. Pat. No. 5,256,472. Advantageously, benzotriazoles and benzophenones are used. As an example, Tinuvin® 213 or Tinuvin® 109 and preferably Tinuvin® 234 from Ciba Specialty Chemicals may be used.

The composition coextrudable with PVDF advantageously comprises:

- 25 to 35 parts of PVDF;
- 45 to 55 parts of PMMA;
- 8 to 18 parts of an acrylic elastomer;
- 2 to 3 parts of a UV absorber;
- the total making 100 parts.

The composition coextrudable with PVDF preferably comprises:

- 30 to 35 parts of PVDF;
- 50 to 55 parts of PMMA;
- 8 to 12 parts of an acrylic elastomer;
- 2 to 3 parts of a UV absorber;
- the total making 100 parts.

The coextrudable composition may be prepared by melt blending the PVDF, the PMMA and the acrylic elastomer to which the UV absorber is added. Advantageously, conventional thermoplastic mixers are used.

With regard to the coextruded film comprising the coextrudable composition and the PVDF layer, the thickness of the PVDF layer is advantageously between 2 and 50 $\mu$m and that of the coextrudable composition between 10 and 100 $\mu$m.

Advantageously, the PVDF base layer comprises, as main constituents, 70 to 100 parts of PVDF per 30 to 0 parts of PMMA respectively and preferably 75 to 85 parts of PVDF per 25 to 15 parts of PMMA respectively.

According to a second form of the invention, the PVDF layer is in the form of two layers: 2

- one placed against the coextrudable layer and comprising, as main constituents, 50 to 90 parts of PVDF per 50 to 10 parts of PMMA respectively; and
- the other (also called the outer layer) comprising, as main constituents, 75 to 100 parts of PVDF per 25 to 0 parts of PMMA respectively.

That is to say the films of the invention comprise, in the following order:

- a coextrudable layer of the composition of the invention (the adhesive layer);
- a layer placed against the coextrudable layer and comprising, as main constituents, 50 to 90 parts of PVDF per 50 to 10 parts of PMMA respectively; and
- a layer (also called the outer layer) comprising, as main constituents, 75 to 100 parts of PVDF per 25 to 0 parts of PMMA respectively.

The outer layer advantageously comprises, as main constituents, 85 to 100 parts of PVDF per 15 to 0 parts of PMMA respectively and preferably 90 to 100 parts of PVDF per 10 to 0 parts of PMMA respectively.

The thickness of the layer of coextrudable composition is advantageously between 10 and 100 $\mu$m and that of each of the other layers is advantageously between 2 and 50 $\mu$m.

The invention also relates to the substrates coated with this film, the coextrudable composition being placed against the substrate.

With regard to the substrate, mention may be made, by way of example, of:

- chlorinated polymers: PVC, PVC plastic, chlorinated PE;
- polymers and copolymers containing styrene, such as ABS, SAN, PS;
- saturated polyesters (PET, PBT, etc.) and copolyesters or blends, unsaturated polyester resins (SMC);
- epoxy and phenolic resins;
- ethylene/alkyl acrylate or ethylene/vinyl acetate copolymers (e.g. EMA or EVA), which are functionalised or unfunctionalised;
- PAs (polyamides) and CoPAs (copolyamides), PEBA, polyesteramides and TPU (thermoplastic polyurethane);
- EVOH (ethylene/vinyl alcohol) copolymer;
- aluminium, steel or mixtures of metals;
- lignin-based composites;
- acrylic compounds (PMMA, etc.)
- glass;
- PVC and PU foams.

In the above description, it is to be understood that the examples of various components are not intended to be limiting of the broad scope of the generically described components.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The following products were used:

- KYNAR® 720: a PVDF homopolymer from Atofina having an MVI (Melt Volume Index) of 10 cm$^3$/10 min (230° C., 5 kg);
- KYNAR® 740: a PVDF homopolymer from Atofina having an MVI (Melt Volume Index) of 1.1 cm$^3$/10 min (230° C., 5 kg);
- ALTUGLAS® BS8: a PMMA from Atoglas having an MVI of 4.5 cm$^3$/10 min (230° C.; 3.8 kg) in bead form containing 12% of a methyl acrylate comonomer;
- ALTUGLAS® V 825 T: a PMMA from Atoglas having an MVI of 2.5 cm$^3$/10 min (230° C.; 3.8 kg);
- TINUVIN® 109: a UV absorber of the benzotriazole type sold by Ciba Specialty Chemicals;

TINUVIN® 213: a UV absorber of the (hydroxyphenyl) benzotriazole type sold by Ciba Specialty Chemicals;

TINUVIN® 234: a UV absorber of the (hydroxyphenyl) benzotriazole type sold by Ciba Specialty Chemicals;

D320: the abbreviation for DURASTRENGTH® D320, denoting a soft/hard core-shell elastomer whose core is a butyl acrylate/butadiene copolymer and whose shell is made of PMMA, 80 nm in size, sold by CECA;

PARALOID® KM 355: denoting a soft/hard core-shell elastomer whose core is a butyl acrylate homopolymer and whose shell is made of PMMA, 150 nm in size, sold by Rohm and Haas.

EXAMPLE 1

According to the Invention

A two-layer film containing a layer composed of 80% KYNAR 720 PVDF and 20% ALTUGLAS BS8, 15 μm in thickness, and a binder 35 μm in thickness according to the following formulation: 31.8% KYNAR 720, 51.7% ALTUGLAS BS8, 2.5% TINUVIN 234 and 15% D320, this film having an elongation at break of 197%, a haze of 14 and, after seven days spent in an oven, no exudation being observable. This film has a UV absorbance sufficient for its use in outdoor applications.

EXAMPLE 2

According to the Invention

A two-layer film containing a layer composed of 80% KYNAR 720 PVDF and 20% ALTUGLAS BS8, 15 μm in thickness, and a binder 35 μm in thickness according to the following formulation: 33.6% KYNAR 740, 53.9% ALTUGLAS BS8, 2.5% TINUVIN 234 and 10% D320, this film having an elongation at break of 210%, a haze of 11 and, after seven days spent in an oven, no exudation being observable. This film has a UV absorbance sufficient for its use in outdoor applications.

EXAMPLE 3

According to the Invention

A two-layer film containing a layer composed of 80% KYNAR 740 PVDF and 20% ALTUGLAS BS8, 15 μm in thickness, and a binder 35 μm in thickness according to the following formulation: 33.6% KYNAR 740, 53.9% ALTUGLAS BS8, 2.5% TINUVIN 109 and 10% D320, this film having an elongation at break of 150%, a haze of 8 and, after seven days spent in an oven, no exudation being observable. This film has a UV absorbance sufficient for its use in outdoor applications.

EXAMPLE 4

According to the Invention

A two-layer film containing a layer composed of 80% KYNAR 740 PVDF and 20% ALTUGLAS BS8, 15 μm in thickness, and a binder 35 μm in thickness according to the following formulation: 33.6% KYNAR 740, 53.9% ALTUGLAS BS8, 2.5% TINUVIN 213 and 10% D320, this film having an elongation at break of 150%, a haze of 6.5 and, after seven days spent in an oven, no exudation being observable. This film has a UV absorbance sufficient for its use in outdoor applications.

EXAMPLE 5

According to the Invention

A two-layer film containing a layer composed of 80% KYNAR 740 PVDF and 20% ALTUGLAS BS8, 15 μm in thickness, and a binder 35 μm in thickness according to the following formulation: 33.6% KYNAR 740, 53.9% ALTUGLAS BS8, 2.5% TINUVIN 234 and 10% D320, this film having an elongation at break of 150%, a haze of 6.5 and, after seven days spent in an oven, no exudation being observable. This film has a UV absorbance sufficient for its use in outdoor applications.

EXAMPLE 6

Comparative Example

A two-layer film containing a layer composed of 80% KYNAR 720 PVDF and 20% ALTUGLAS V825T, 15 μm in thickness, and a binder 35 μm in thickness according to the following formulation: 32.5% KYNAR 720, 32.5% ALTUGLAS V825T, 2.5% TINUVIN 234 and 32.5% PARALOID KM 355, this film having an elongation at break of 150%, a haze of 15 and, after one day spent in an oven, exudation being observable. This film has a UV absorbance insufficient for its use in outdoor applications.

EXAMPLE 7

Comparative Example

A two-layer film containing a layer composed of 80% KYNAR 720 PVDF and 20% ALTUGLAS V825T, 15 μm in thickness, and a binder 35 μm in thickness according to the following formulation: 32.5% KYNAR 720, 32.5% ALTUGLAS V825T, 2.5% TINUVIN 234 and 32.5% DURASTRENGTH D320, this film having an elongation at break of 150%, a haze of 15 and, after one day spent in an oven, exudation being observable. This film has a UV absorbance insufficient for its use in outdoor applications.

The preceding examples can be repeated with similar success by substituting the generically or specifically described reactants and/or operating conditions of this invention for those used in the preceding examples.

The entire disclosures of all applications, patents and publications, cited herein and of corresponding French application No. 02.09024, filed Jul. 17, 2002, and French application No. 02.11991, filed Sep. 27, 2002 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A composition comprising by weight:
    20 to 40 parts of PVDF;
    40 to 60 parts of PMMA;
    5 to 18 parts of an acrylic elastomer;
    1 to 4 parts of a UV absorber;
    the total making 100 parts.

2. A composition according to claim 1 in which the proportions are:
    25 to 35 parts of PVDF;
    45 to 55 parts of PMMA;
    8 to 18 parts of an acrylic elastomer;
    2 to 3 parts of a UV absorber;
    the total making 100 parts.

3. A composition according to claim 1 in which the proportions are:
    30 to 35 parts of PVDF;

50 to 55 parts of PMMA;

8 to 12 parts of an acrylic elastomer;

2 to 3 parts of a UV absorber;

the total making 100 parts.

4. A composition according to claim 1, wherein the acrylic elastomer is a core-shell copolymer.

5. A composition according to claim 4, wherein the core-shell copolymer is chosen from soft/hard, hard/soft/hard and hard/soft/semi-hard copolymers.

6. A composition according to claim 4, wherein the acrylic elastomer is a soft/hard core-shell wherein the core is a butyl acrylate homopolymer and the shell is PMMA.

7. A composition according to claim 6, in the form of a film.

8. A coextruded film comprising a layer of the coextrudable composition according to claim 4, and directly attached to the latter and a PVDF-based layer comprising, as main constituents by weight, 50 to 100 parts of PVDF per 50 to 0 parts of PMMA respectively.

9. A film according to claim 8, wherein the acrylic elastomer is a soft/hard core-shell wherein the core is a butyl acrylate homopolymer and the shell is PMMA.

10. A coextruded film comprising, in the following order:

a coextrudable layer of a composition according to claim 4;

a layer placed against the coextrudable layer and comprising, as main constituents by weight, 50 to 90 parts of PDVE per 50 to 10 parts of PMMA respectively; and an outer layer comprising, as main constituents by weight, 75 to 100 parts of PVDF per 25 to 0 parts of PMMA respectively.

11. A coextruded film comprising a layer of the coextrudable composition according to claim 1, and directly attached to the latter and a PVDF-based layer comprising, as main constituents by weight, 50 to 100 parts of PVDF per 50 to 0 parts of PMMA respectively.

12. A film according to claim 11, in which the PVDF-based layer comprises, as main constituents, 70 to 100 parts of PVDF per 30 to 0 parts of PMMA respectively.

13. A film according to claim 12, in which the PVDF-based layer comprises, as main constituents, 75 to 85 parts of PVDF per 25 to 15 parts of PMMA respectively.

14. A film according to claim 11, in which the thickness of the PVDF layer is between 2 and 50 $\mu$m and that of the coextrudable composition between 10 and 100 $\mu$m.

15. A substrate provided with a superposed film according to claim 11.

16. A coextruded film comprising, in the following order:

a coextrudable layer of a composition according to claim 1;

a layer placed against the coextrudable layer and comprising, as main constituents by weight, 50 to 90 parts of PVDF per 50 to 10 parts of PMMA respectively; and an outer layer comprising, as main constituents by weight, 75 to 100 parts of PVDF per 25 to 0 parts of PMMA respectively.

17. A film according to claim 16, in which the outer layer comprises, as main constituents, 85 to 100 parts of PVDF per 15 to 0 parts of PMMA respectively.

18. A film according to claim 16, in which the thickness of the layer of coextrudable composition is between 10 and 100 $\mu$m and that of each of the other layers is between 2 and 50 $\mu$m.

19. A substrate provided with a superposed film according to claim 16.

20. A composition according to claim 1, in the form of a film.

* * * * *

UNITED STATES PATENT AND TRADEMARK OFFICE
CERTIFICATE OF CORRECTION

PATENT NO. : 6,811,859 B2
DATED : November 2, 2004
INVENTOR(S) : Anthony Bonnet et al.

It is certified that error appears in the above-identified patent and that said Letters Patent is hereby corrected as shown below:

Column 9,
Line 18, delete the word "and" following "to the latter"
Line 30, reads "PDVE" should read -- PVDF --
Line 38, delete the word "and" following "to the latter"

Signed and Sealed this

Twenty-fourth Day of May, 2005

JON W. DUDAS
*Director of the United States Patent and Trademark Office*